(12) United States Patent
Kennelly et al.

(10) Patent No.: US 12,423,101 B1
(45) Date of Patent: Sep. 23, 2025

(54) HARDWARE GUIDED SOFTWARE PREFETCH INSERTION

(71) Applicant: Google LLC, Mountain View, CA (US)

(72) Inventors: Christopher Thomas Kennelly, Croton-on-Hudson, NY (US); Akanksha Jain, Mountain View, CA (US); Milad Olia Hashemi, San Francisco, CA (US); Hannah Lin, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/654,249

(22) Filed: May 3, 2024

Related U.S. Application Data

(60) Provisional application No. 63/639,310, filed on Apr. 26, 2024.

(51) Int. Cl.
  *G06F 9/30* (2018.01)
  *G06F 9/38* (2018.01)
  *G06F 11/34* (2006.01)

(52) U.S. Cl.
  CPC ........ *G06F 9/30047* (2013.01); *G06F 9/3802* (2013.01); *G06F 11/3409* (2013.01)

(58) Field of Classification Search
  CPC . G06F 9/30047; G06F 9/3802; G06F 11/3409
  See application file for complete search history.

(56) References Cited

U.S. PATENT DOCUMENTS

| | | | |
|---|---|---|---|
| 6,233,645 B1 * | 5/2001 | Chrysos | G06F 9/5016 |
| | | | 712/E9.055 |
| 7,533,242 B1 * | 5/2009 | Moll | G06F 9/30047 |
| | | | 711/213 |
| 7,707,359 B2 | 4/2010 | Mesard et al. | |
| 7,904,661 B2 | 3/2011 | Fluhr et al. | |

(Continued)

FOREIGN PATENT DOCUMENTS

WO   2006130825 A2   12/2006

OTHER PUBLICATIONS

Srinath, S., et al., "Feedback Directed Prefetching: Improving the Performance and Bandwidth-Efficiency of Hardware Prefetchers", 2007 IEEE 13th International Symposium on High Performance Computer Architecture, IEEE, Feb. 2007. 12 pages.

*Primary Examiner* — Jacob Petranek
(74) *Attorney, Agent, or Firm* — Lerner David LLP

(57) ABSTRACT

Generally disclosed herein is an approach for identifying target code locations for software prefetching instructions based on hardware prefetching information. The target code locations can be identified based on the locations where the hardware prefetchers were designed to prefetch loads. Hardware cache events related to processor events for different caches can be monitored for cache misses in a system running when hardware prefetchers are active and inactive. Code locations that may benefit from the use of the hardware prefetchers may be determined based on an ablation study. The identified code locations may be treated as recognized memory access patterns. Software prefetchers can be con- (Continued)

figured to use these memory access patterns for prefetching data while avoiding an extended time required to identify memory access patterns (i.e. a warm-up period) and fetching in locations where hardware prefetching is beneficial.

20 Claims, 5 Drawing Sheets

(56) References Cited

U.S. PATENT DOCUMENTS

| | | |
|---|---|---|
| 8,285,941 B2 | 10/2012 | Ekanadham et al. |
| 8,490,065 B2 | 7/2013 | Archambault et al. |
| 8,533,437 B2 | 9/2013 | Henry et al. |
| 8,707,282 B2 | 4/2014 | Joshi et al. |
| 9,442,727 B2 | 9/2016 | Chou |
| 10,102,134 B2 | 10/2018 | Chishti et al. |
| 11,038,984 B2 | 6/2021 | Cherubini et al. |
| 11,080,052 B2 | 8/2021 | Gschwind et al. |
| 2003/0145314 A1 | 7/2003 | Nguyen et al. |
| 2013/0179663 A1* | 7/2013 | Heisch ............... G06F 9/383 712/E9.033 |
| 2015/0089149 A1* | 3/2015 | Kimura ............ G06F 12/0862 711/137 |
| 2015/0106590 A1* | 4/2015 | Chou ............... G06F 11/3037 712/207 |
| 2018/0165204 A1* | 6/2018 | Venkatesh ........... G06F 12/084 |
| 2020/0272474 A1* | 8/2020 | Gabor ............. G06F 12/1027 |
| 2021/0149805 A1* | 5/2021 | Pinho .............. G06F 12/0862 |
| 2021/0342155 A1 | 11/2021 | Homer |
| 2024/0111676 A1* | 4/2024 | Kalamatianos ..... G06F 9/30047 |

* cited by examiner

HARDWARE GUIDED SOFTWARE PREFETCH INSERTION

BACKGROUND

Many modern microprocessor designs contain hardware prefetchers that allow data to be loaded ahead of its use. Hardware prefetchers can be configured to examine the stream of memory accesses and identify potential patterns of particular memory accesses. Hardware prefetchers often require warm-up periods to identify such potential patterns based on examinations of the stream of memory accesses such as sequential access of data, and frequencies of access of such data at every N byte.

Software prefetching is an alternative method of prefetching data. Software prefetchers enable the programmer or compiler to insert prefetch instructions directly in a program without a warm-up period. Another advantage of the software prefetchers is that they can be used for irregular memory accesses that the hardware prefetchers are often incapable of handling. However, identifying the correct time to prefetch instructions for irregular memory accesses can be challenging.

BRIEF SUMMARY

The technology generally relates to an approach for identifying target code locations for software prefetching instructions based on hardware prefetching information. The target code locations can be identified based on the locations where the hardware prefetchers were designed to prefetch loads. Hardware cache events related to processor events for different caches can be monitored for cache misses in a system running when hardware prefetchers are active and inactive. Code locations that may benefit from the use of the hardware prefetchers may be determined based on an ablation study. The identified code locations may be treated as recognized memory access patterns. Software prefetchers can be configured to use these memory access patterns for prefetching data while avoiding an extended time required to identify memory access patterns (i.e. a warm-up period) and fetching in locations where hardware prefetching is beneficial.

An aspect of the disclosure provides for a system for hardware-guided software prefetch insertions, the system comprising: one or more memories; one or more processors in communication with the one or more memories, the one or more processors configured to: receive first information related to a first hardware event while a hardware prefetcher is active; disable the hardware prefetcher; receive second information related to a second hardware event while the hardware prefetcher is disabled; compare the first information with the second information; determine one or more target code locations based on the comparison; and generate software prefetching instructions for the target code locations.

In some examples, the first hardware event and the second hardware event are monitored using telemetries.

In some examples, the first hardware event and the second hardware event comprise memory bandwidth saturation, cache misses, and memory latency.

In some examples, the first information and the second information are compared using metrics computed based on measurements of the memory bandwidth saturation, the cache misses, and the memory latency.

In some examples, the one or more target code locations are identified based on target functions.

In some examples, the target functions include prefetch-friendly functions and prefetch-unfriendly functions.

In some examples, the prefetch-friendly functions include one or more functions that regress in performance due to an increase in last-level cache (LLC) misses in response to the hardware prefetcher being disabled.

In some examples, the prefetch-unfriendly functions include one or more functions that gain performance and decrease CPU cycles due to a lower memory latency in response to the hardware prefetcher being disabled.

In some examples, the software prefetch insertion is generated based on one or more parameters selected from a group comprising a prefetch address, a prefetch distance, and a prefetch degree.

In some examples, the one or more target code locations are sent to a user for a manual modification of one or more codes associated with the one or more target code locations.

In some examples, the one or more processors are configured to automatically modify one or more codes associated with the one or more target code locations.

Another aspect of the disclosure provides for a method for hardware-guided software prefetch insertions, the method comprising: receiving, by one or more processors, first information related to a first hardware event while a hardware prefetcher is active; disabling, by the one or more processors, the hardware prefetcher; receiving, by the one or more processors, second information related to a second hardware event while the hardware prefetcher is disabled; comparing, by the one or more processors, the first information with the second information; determining, by the one or more processors, one or more target code locations based on the comparison; and generating, by the one or more processors, software prefetch instructions for the target code locations.

In some examples, the first hardware event and the second hardware event are monitored using telemetries.

In some examples, the first hardware event and the second hardware event comprise memory bandwidth saturation, cache misses, and memory latency.

In some examples, the first information and the second information are compared using metrics computed based on measurements of the memory bandwidth saturation, the cache misses, and the memory latency.

In some examples, the one or more target code locations are identified based on target functions.

In some examples, the target functions include prefetch-friendly functions and prefetch-unfriendly functions.

In some examples, the prefetch-friendly functions include one or more functions that regress in performance due to an increase in last-level cache (LLC) misses in response to the hardware prefetcher being disabled.

In some examples, the prefetch-unfriendly functions include one or more functions that gain performance and decrease CPU cycles due to a lower memory latency in response to the hardware prefetcher being disabled.

In some examples, the software prefetch insertion is generated based on one or more parameters selected from a group comprising a prefetch address, a prefetch distance, and a prefetch degree.

DETAILED DESCRIPTION

Figure 1:
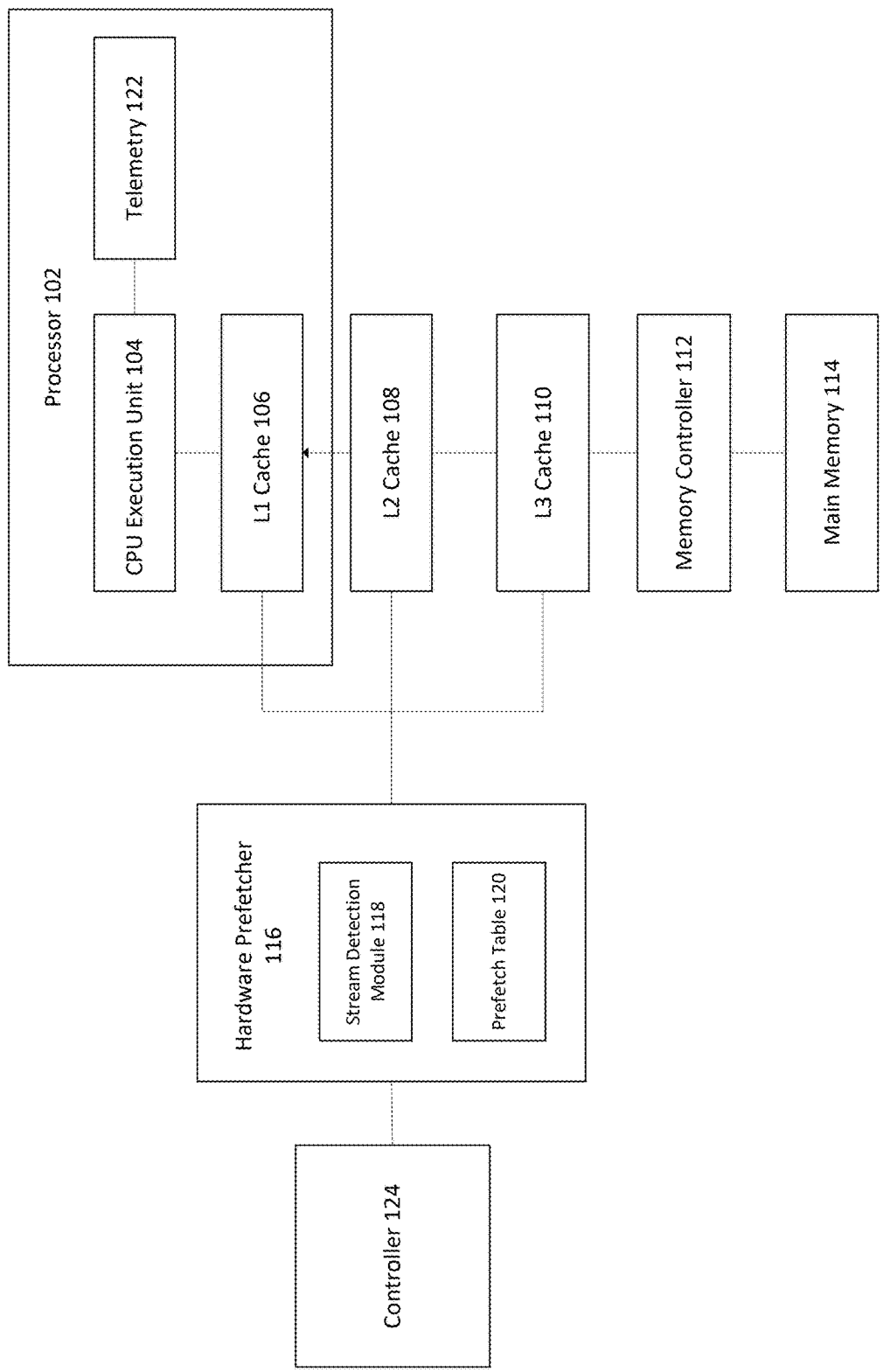
FIG. 1 depicts an example hardware prefetching system according to aspects of the disclosure.

Generally disclosed herein is an approach for providing software prefetching instructions for target code locations identified based on hardware prefetching locations. The target code locations are code locations that may benefit from the use of the hardware prefetchers. Code locations may refer to memory addresses where the code to be prefetched is stored in the memory. The target code locations may be identified based on ablation studies. Ablation studies may refer to the investigation of the performance of a system by removing certain components to understand the contribution of the component to the overall system. For example, hardware prefetchers can be disabled to investigate the effect (e.g. memory latency and memory bandwidth utilization) of the disabled hardware prefetcher compared to the effect on the system when the hardware prefetcher is active.

According to some examples, an ablation study may be performed by using a global profiler that continuously monitors a program counter that tracks the memory address of the next instruction to be executed in a program. The global profiler may also monitor last-level cache (LLC) misses that may occur in the caches embedded not only in single hardware but in the clusters of server machines. The global profiler may store the monitored information in memory residing within a controller. The global profiler may sample a limited number of random server machines at a given time to reduce profiling overhead. When the global profiler is not sampling, the global profiler may be disabled.

The global profiler may collect data related to CPU performance and LLC misses. The collected data may be used to identify prefetch-friendly functions and prefetch-unfriendly functions. The prefetch-friendly functions may include functions that regress in performance and increase CPU cycles due to a significant increase in LLC misses per kilo instructions (MPKI) when hardware prefetchers are disabled. The prefetch-unfriendly functions may include functions that gain performance and decrease CPU cycles due to lower memory latency and less cache pollution when hardware prefetchers are disabled. For the prefetch-unfriendly functions, the hardware prefetchers may have difficulty accurately predicting memory access patterns, leading to untimely or incorrect prefetches and wasted memory bandwidth.

Prefetch-friendly functions may include various common leaf functions such as data compression, data transmission, data hashing, and data movement. The aforementioned functions may be more suitable software prefetchers since they are typically contained in library functions and account for a disproportionately large number of cluster-wide server machines' CPU cycles. Prefetch-friendly functions may provide direct knowledge of what will be accessed and how much data will be accessed. For these reasons, software prefetchers can be designed more precisely as to the exact addresses for prefetching based on the pre-determined memory accesses without a warm-up period like hardware prefetchers do.

Software prefetchers for the target code locations may be designed based on one or more design parameters, such as prefetch addresses which indicate the location for software prefetching, prefetch distances which indicate how far in advance data is fetched, and prefetch degrees, which indicate how much data is prefetched.

A cluster-wide profiling tool may allow for collecting a larger stream of data being accessed to gather call argument sizes for certain functions, cache misses, and a CPU cycle at an instruction level. According to some examples, the cluster-wide profiling tool may generate instruction-level metrics that can be used to identify the prefetch addresses that have the highest potential for improved performance of the CPUs.

The design parameters may be adjusted as the effectiveness of the software prefetchers is tested. In this regard, each prefetching address, distance, and degree may be continually tested. An optimal combination of the parameters that can increase the performance of the CPUs and reduce memory latency at a higher rate than other combinations can be determined and used for the software prefetchers.

A list of recommended target code locations can be provided by a controller to a user such that the user can manually modify the code for each code location. In some examples, the source code edits can be generated and provided to the user such that the user does not need to manually modify the code for each code location. In other examples, the code locations can directly be provided to the compiler to insert the prefetching instructions when the source code is being compiled in accordance with one embodiment of the present disclosure as described in more detail below.

FIG. 1 depicts an example hardware prefetching system. Computing environment 100 may include processor 102 comprising CPU execution unit 104, L1 cache 106, and telemetry 122. Processor 102, L2 cache 108, L3 cache 110, memory controller 112, main memory 114, hardware prefetcher 116, and controller 124 may be implemented on a single computing device or on more than one computing device. For example, a computing device may include processor 102, L2 cache 108, L3 cache 110, memory controller 112, main memory 114, and hardware prefetcher 116. Another computing device may include controller 124.

CPU execution unit 104 may be communicably coupled with telemetry 122. CPU execution unit 104 may load and store data in accordance with prefetch instructions received from hardware prefetcher 116. CPU execution unit 104 may be communicably coupled with L1 cache 106, L2 cache 108, and L3 cache 110.

Memory controller 112 may be configured to control access to main memory 114 and L1 cache 106, L2 cache 108, and/or L3 cache 110 by CPU execution unit 104. Memory controller 112 may be configured to coordinate data transfer between main memory 114 and each cache. Main memory 114 may include memory such as random-access memory (RAM) that stores operating systems, applications, data, etc.

Hardware prefetcher 116 may be communicably coupled with L1 cache 106, L2 cache 108, and L3 cache 110. Hardware prefetcher 116 may be configured to identify patterns in memory accesses by examining the stream of memory accesses in one or more of L1 cache 106, L2 cache 108, and L3 cache 110. Hardware prefetcher 116 may monitor the memory access pattern within each of the above caches using stream detection module 118 and predict what data will be accessed in the future. The data that has been accessed in each cache and the predicted data access can be recorded in prefetch table 120. Hardware prefetcher 116 may be communicable with controller 124. Controller 124 may be configured to disable or enable hardware prefetcher 116 while performing an ablation study.

Telemetry 122 may be coupled to CPU execution unit 104. Telemetry 122 may monitor the performances of processor 102, L1 cache 106, L2 cache 108, L3 cache 110, and/or main memory 114. Telemetry 122 may detect various performance indicators such as cache misses per kilo instruction, increase in CPU cycles, etc. Telemetry 122 may monitor the aforementioned performance indicators when hardware prefetcher 116 is enabled and/or disabled. The performance indicators may be compared to identify two groups of functions: prefetch-friendly functions and prefetch-unfriendly functions. Prefetch-unfriendly functions may include functions that access the memory stream in irregular manners such that hardware prefetcher 116 may not predict the patterns of the memory access with acceptable accuracy.

Based on the information related to both prefetch-friendly functions and prefetch-unfriendly functions, controller 124 may be configured to disable hardware prefetcher 116 and store information related to both prefetch-friendly functions and prefetch-unfriendly functions in prefetch table 120. Hardware prefetcher 116 may be disabled for prefetch-unfriendly functions since neither hardware prefetching instructions nor software prefetching instructions would be beneficial for these functions. Hardware prefetcher 116 may also be disabled for prefetch-friendly functions, such that the system can generate software prefetching instructions in lieu of hardware prefetcher 116 in accordance with one embodiment described below.

Figure 2:
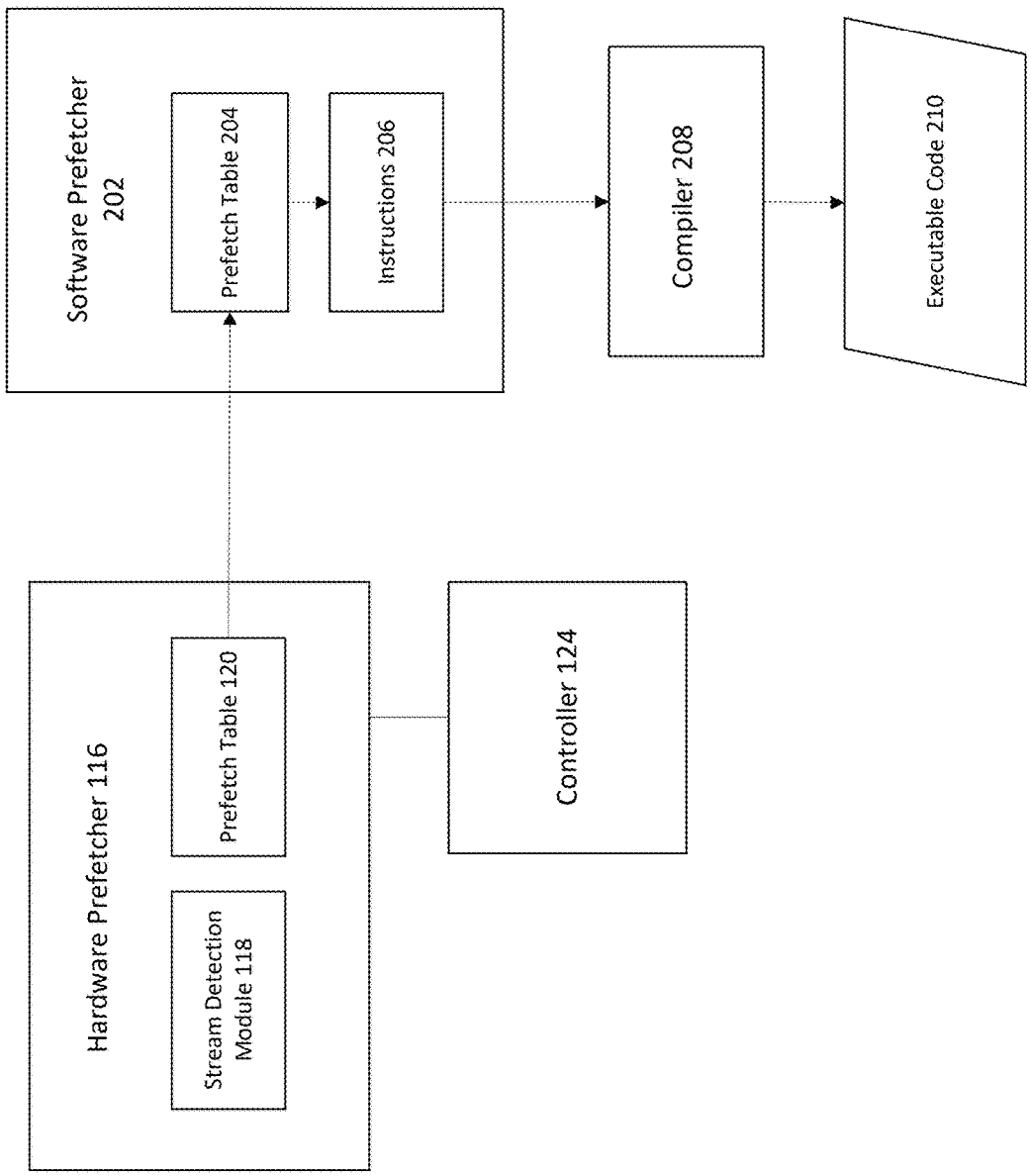
FIG. 2 depicts an example hardware-guided software prefetching system according to aspects of the disclosure.

FIG. 2 depicts an example hardware-guided software prefetching system. Hardware prefetcher 116 may send target code location information to software prefetcher 202. Prefetch table 120 may be included in hardware prefetcher 116. Prefetch table 120 may contain information about the target code location information. According to some examples, the target code location information may be determined solely based on the prefetch-friendly function information. In other examples, controller 124 may utilize a machine learning model trained with both the prefetch-friendly function information and the prefetch-unfriendly function information to predict more effective and accurate target code locations for optimal benefits of the prefetching. Prefetch table 204 of software prefetcher 202 may receive the target code location information and generate instruction 206 to prefetch data at the target code locations.

Compiler 208 may receive instructions 206 in the form of a source language. Compiler 208 may translate the source language into executable code 210. When instructions 206 is sent to compiler 208 by software prefetcher 202, controller 124 may disable hardware prefetcher 116.

It is advantageous to utilize software prefetcher 202 to prefetch instructions for the identified target code locations, since unlike hardware prefetchers, software prefetcher 202 does not require a warm-up period to observe past patterns of the memory access to predict future memory accesses. Software prefetcher 202's prefetching instructions can be directly embedded in the function to target the memory access pattern without observing the past patterns.

According to some other examples, a list of the target code locations can be sent directly to a user such that the user may manually modify the code for selected code locations. In other examples, hardware prefetcher 116 may communicate with other software that can automatically edit the code for the target code locations and provide the edited code to the user for approval.

Figure 3:
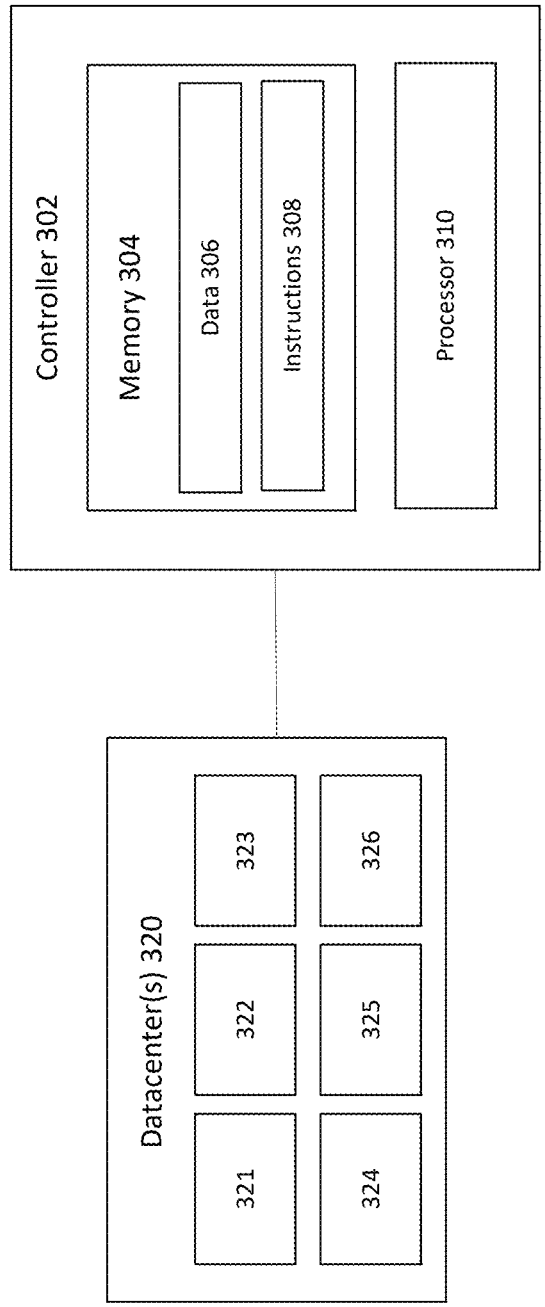
FIG. 3 depicts an example server system according to aspects of the disclosure.

FIG. 3 depicts an example server system including a server device, such as controller 302. Controller 302 may be compared to controller 124. Controller 302 may be implemented by one or more server computing devices. Controller 302 may include hardware configured to monitor performance when hardware prefetchers implemented in each of computing devices 321-326 are enabled and/or disabled. It is to be understood that for the purpose of the present disclosure, the terms computing devices, servers, server computing devices, and server machines may be used interchangeably. Controller 302 may remotely enable or disable the hardware prefetchers. Controller 302 may perform ablation studies on each computing device 321-326 by comparing the performance indicators collected when the hardware prefetchers are disabled with the performance indicators collected when the hardware prefetchers are enabled. According to one example, controller 302 may reside within and control hardware prefetchers of the computing devices located in a particular data center. According to other examples, the controller 302 may be coupled to one or more data centers 320, such as through a network, and may manage operations of multiple data centers. In some examples, more than one controller may control hardware prefetchers of computing devices within a single data center.

Data center 320 may be positioned at a considerable distance from controller 302 and/or other data centers (not shown). The one or more computing devices 321-326 may be processors, servers, general-purpose computers, cards, cells, or the like. In some examples, the computing devices in the data center may have different processing capabilities and handle different workloads. While only a few of these computing devices, such as computing devices 321-326, are shown, it should be understood that each data center 320 may include any number of computing devices. The number of computing devices in a first data center may differ from the number of computing devices in a second data center. Moreover, it should be understood that the number of computing devices in each data center may vary over time, for example, as computing devices are removed, replaced, upgraded, or expanded.

In some examples, controller 302 may communicate with the computing devices 321-326 in the data center 320 and may facilitate the execution of programs. For example, controller 302 may track the capacity, status, workload, or other information of each computing device, and use such information to enable or disable hardware prefetchers implemented in each computing device 321-326. Controller 302 may include a processor 310 and memory 304, including data 306 and instructions 308. In other examples, such operations may be performed by one or more of the computing devices 321-326 in data center 320, and an independent controller may be omitted from the system.

Controller 302 may contain a processor 310, memory 304, and other components typically present in server computing devices. Memory 304 can store information accessible by processor 310, including instructions 308 that can be executed by processor 310. Memory 304 can also include data 306 that can be retrieved, manipulated, or stored by the processor 310. Memory 304 may be a type of non-transitory computer-readable medium capable of storing information accessible by processor 310, such as a hard drive, solid-state drive, tape drive, optical storage, memory card, ROM, RAM, DVD, CD-ROM, write-capable, and read-only memories. Processor 310 can be a well-known processor or other lesser-known types of processors. Alternatively, processor 310 can be a dedicated controller such as an ASIC.

Instructions 308 can be a set of instructions executed directly, such as machine code, or indirectly, such as scripts, by processor 310. In this regard, the terms "instructions," "steps" and "programs" can be used interchangeably herein. Instructions 308 can be stored in object code format for direct processing by processor 310, or other types of computer language including scripts or collections of independent source code modules that are interpreted on demand or compiled in advance. Instructions 308 may include software prefetching instructions for the target code locations identified by controller 302. When the software prefetching instructions are transmitted to data center 320, controller 302 may be configured to disable all or part of the hardware prefetchers implemented in computing devices 321-326.

Data 306 can be retrieved, stored, or modified by processor 310 in accordance with instructions 308. For instance, although the system and method are not limited by a particular data structure, data 306 can be stored in computer registers, in a relational database as a table such as prefetch table 120 or prefetch table 204 having a plurality of different fields and records, or XML documents. Data 306 can also be formatted in a computer-readable format such as, but not limited to, binary values, ASCII, or Unicode. Moreover, data 306 can include information sufficient to identify relevant information, such as numbers, descriptive text, proprietary codes, pointers, references to data stored in other memories, including other network locations, or information that is used by a function to calculate relevant data.

Although FIG. 3 functionally illustrates processor 310 and memory 304 as being within the same block, processor 310 and memory 304 may include multiple processors and memories that may or may not be stored within the same physical housing. For example, some of instructions 308 and data 306 can be stored on a removable CD-ROM and others within a read-only computer chip. Some or all of the instructions and data can be stored in a location physically remote from, yet still accessible by, processor 310. Similarly, processor 310 can actually include a collection of processors, which may or may not operate in parallel.

Figure 4:
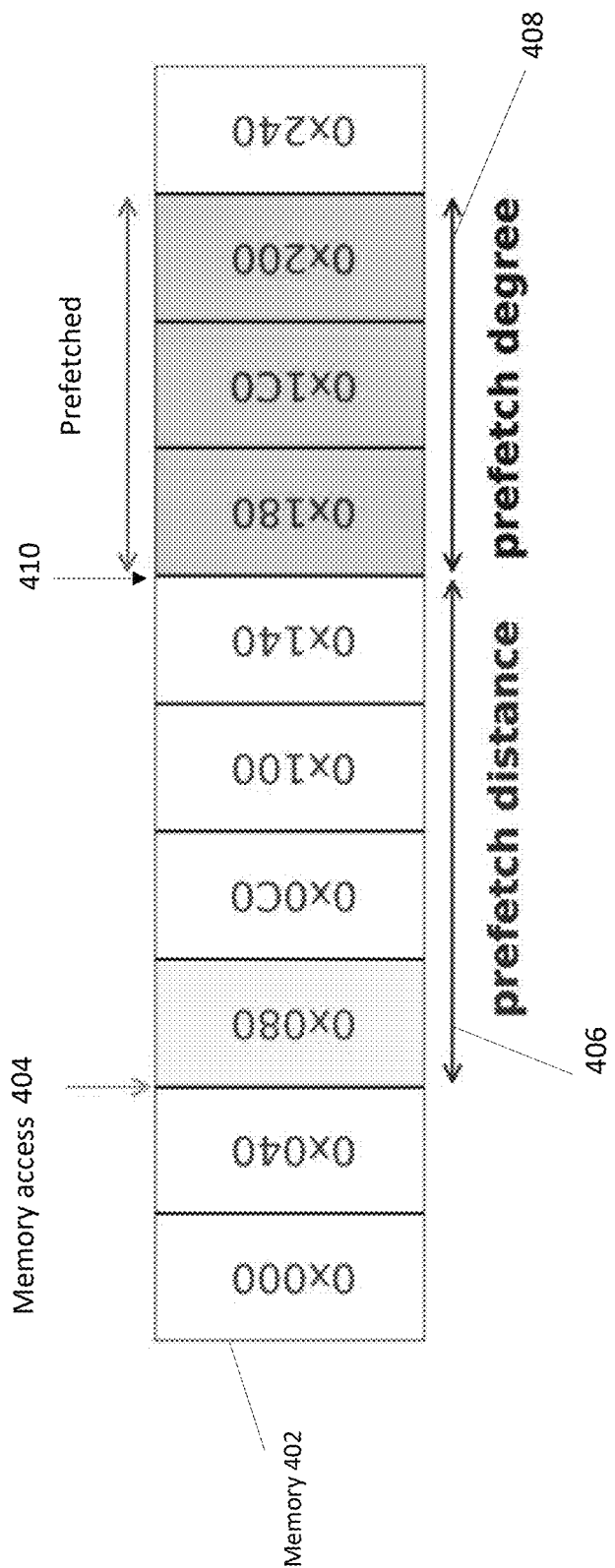
FIG. 4 depicts a block diagram of example memory access using software prefetchers according to aspects of the disclosure.

FIG. 4 depicts a block diagram of example memory accesses using software prefetchers. Software prefetching instructions such as instructions 206 illustrated in FIG. 2 may be designed based on one or more key design parameters. Instructions 206 can be modified as prefetch address 404, prefetch distance 406, and prefetch degree 408 are modified. Prefetch address 410 may be an address within memory 402 where a prefetching occurs when address 404 is loaded, resulting in prefetch distance 406 of four (4) cache lines (i.e. 0x080, 0x0C0, 0x100, 0x140). As prefetch distance 406 may represent how far in advance certain data should be prefetched, a short prefetch distance may have a higher chance of being accurate but can be less timely. A long prefetch distance can be more likely to be timely but may have a higher chance of being inaccurate. Prefetch degree 408 may represent how much data will be prefetched at prefetch distance 406. A small degree may result in less prefetch traffic but may lead to lower prefetch benefit, whereas a large degree can lead to greater inaccuracy.

Controller 302 as illustrated in FIG. 3 may be configured to consistently test the effectiveness of the software prefetchers using a sensor(s) such as telemetry 122 and adjust the above parameters when it is necessary to improve the effectiveness of the software prefetchers. Controller 302 may also determine the best-performing combination of the above parameters. Instructions 206 can be generated based on the determined best-performing combination of the parameters.

Figure 5:
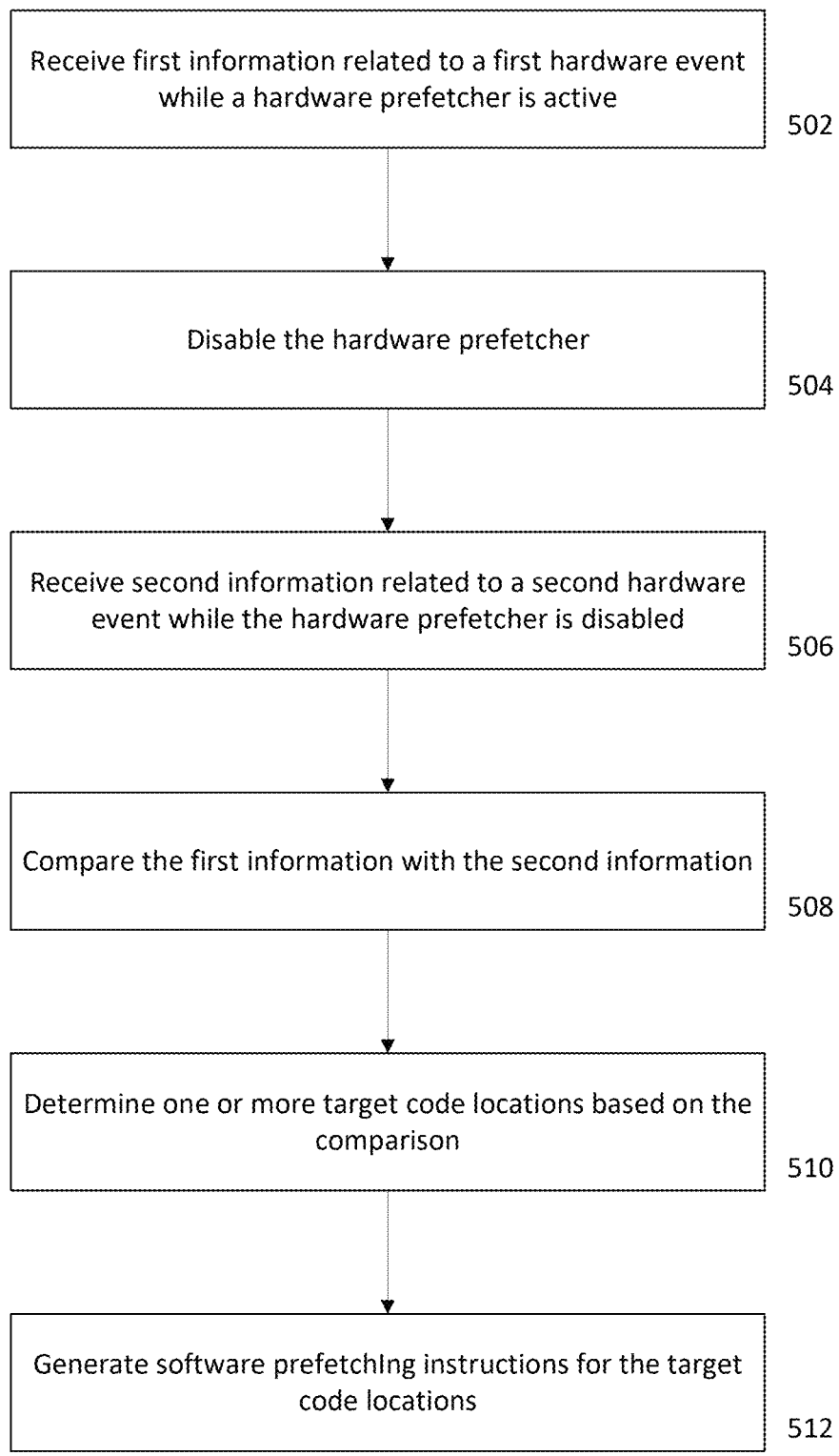
FIG. 5 depicts a flow diagram illustrating an example method according to aspects of the disclosure.

FIG. 5 depicts a flow diagram illustrating an example method. According to block 502, first information related to the first hardware event may be received while a hardware prefetcher is active. The first information may include performance indicators such as last-level cache (LLC) misses per kilo instructions (MPKI), a degree of increase/decrease CPU cycles, a degree of lower memory latency and cache pollution, etc. First information can be collected when the hardware prefetcher prefetches data in advance.

According to block 504, the hardware prefetcher may be disabled. For example, the controller of a server machine may be configured to disable the hardware prefetcher to perform ablation studies to investigate the effects of the hardware prefetchers. The same performance indicators may be collected while the hardware prefetcher is inactive according to block 506.

According to block 508, the first information and the second information may be compared. The processor may be configured to determine particular code locations where the prefetching was beneficial and store the information related to such code locations in storage. The process may also be configured to determine the code locations where the prefetching is not beneficial (e.g. prefetching leads to regression of the performance, etc.) and store the information related to these code locations in the same storage.

According to block 510, one or more target code locations may be determined based on the comparison. The target code locations may be the locations where the prefetch-friendly functions take place. Such functions may include, but are not limited to, compression, transmission, hashing, and movement of particular data.

According to block 512, software prefetching instructions may be generated for the target code locations. The software prefetching instructions can prefetch data at the target code locations without a warm-up period.

Although the technology herein has been described with reference to particular examples, it is to be understood that these examples are merely illustrative of the principles and applications of the present technology. It is, therefore, to be understood that numerous modifications may be made and that other arrangements may be devised without departing from the spirit and scope of the present technology as defined by the appended claims.

Unless otherwise stated, the foregoing alternative examples are not mutually exclusive but may be implemented in various combinations to achieve unique advantages. As these and other variations and combinations of the features discussed above can be utilized without departing from the subject matter defined by the claims, the foregoing description should be taken by way of illustration rather than by way of limitation of the subject matter defined by the claims. In addition, the provision of the examples described herein, as well as clauses phrased as" "such as," "including," and the like, should not be interpreted as limiting the subject matter of the claims to the specific examples; rather, the examples are intended to illustrate only one of many possible implementations. Further, the same reference numbers in different drawings can identify the same or similar elements.

The invention claimed is:

1. A system for hardware-guided software prefetch insertions, the system comprising:
   one or more memories;
   one or more processors in communication with the one or more memories, the one or more processors configured to:

receive first information related to a first hardware event while a hardware prefetcher is active;

disable the hardware prefetcher;

receive second information related to a second hardware event while the hardware prefetcher is disabled;

compare the first information with the second information;

determine one or more target code locations based on the comparison; and generate software prefetching instructions for the target code locations.

2. The system of claim 1, wherein the first hardware event and the second hardware event are monitored using telemetries.

3. The system of claim 1, wherein the first hardware event and the second hardware event comprise memory bandwidth saturation, cache misses, and memory latency.

4. The system of claim 3, wherein the first information and the second information are compared using metrics computed based on measurements of the memory bandwidth saturation, the cache misses, and the memory latency.

5. The system of claim 1, wherein the one or more target code locations are identified based on target functions.

6. The system of claim 5, wherein the target functions include prefetch-friendly functions and prefetch-unfriendly functions.

7. The system of claim 6, wherein the prefetch-friendly functions include one or more functions that regress in performance due to an increase in last-level cache (LLC) misses in response to the hardware prefetcher being disabled.

8. The system of claim 6, wherein the prefetch-unfriendly functions include one or more functions that gain performance and decrease CPU cycles due to a lower memory latency in response to the hardware prefetcher being disabled.

9. The system of claim 1, wherein the software prefetch insertion is generated based on one or more parameters selected from a group comprising a prefetch address, a prefetch distance, and a prefetch degree.

10. The system of claim 1, wherein the one or more target code locations are sent to a user for a manual modification of one or more codes associated with the one or more target code locations.

11. The system of claim 1, wherein the one or more processors are configured to automatically modify one or more codes associated with the one or more target code locations.

12. A method for hardware-guided software prefetch insertions, the method comprising:

receiving, by one or more processors, first information related to a first hardware event while a hardware prefetcher is active;

disabling, by the one or more processors, the hardware prefetcher;

receiving, by the one or more processors, second information related to a second hardware event while the hardware prefetcher is disabled;

comparing, by the one or more processors, the first information with the second information;

determining, by the one or more processors, one or more target code locations based on the comparison; and generating, by the one or more processors, software prefetch instructions for the target code locations.

13. The method of claim 12, wherein the first hardware event and the second hardware event are monitored using telemetries.

14. The method of claim 12, wherein the first hardware event and the second hardware event comprise memory bandwidth saturation, cache misses, and memory latency.

15. The method of claim 14, wherein the first information and the second information are compared using metrics computed based on measurements of the memory bandwidth saturation, the cache misses, and the memory latency.

16. The method of claim 12, wherein the one or more target code locations are identified based on target functions.

17. The method of claim 16, wherein the target functions include prefetch-friendly functions and prefetch-unfriendly functions.

18. The method of claim 17, wherein the prefetch-friendly functions include one or more functions that regress in performance due to an increase in last-level cache (LLC) misses in response to the hardware prefetcher being disabled.

19. The method of claim 17, wherein the prefetch-unfriendly functions include one or more functions that gain performance and decrease CPU cycles due to a lower memory latency in response to the hardware prefetcher being disabled.

20. The method of claim 12, wherein the software prefetch insertion is generated based on one or more parameters selected from a group comprising a prefetch address, a prefetch distance, and a prefetch degree.

* * * * *